(12) United States Patent
Datte et al.

(10) Patent No.: US 12,145,395 B2
(45) Date of Patent: Nov. 19, 2024

(54) PERSONAL IDENTIFICATION MARKING LABEL DEVICE

(71) Applicants: Christine Datte, Pottsville, PA (US); Adrian Datte, Pottsville, PA (US)

(72) Inventors: Christine Datte, Pottsville, PA (US); Adrian Datte, Pottsville, PA (US)

(*) Notice: Subject to any disclaimer, the term of this patent is extended or adjusted under 35 U.S.C. 154(b) by 16 days.

(21) Appl. No.: 17/702,147

(22) Filed: Mar. 23, 2022

(65) Prior Publication Data

US 2023/0127789 A1    Apr. 27, 2023

Related U.S. Application Data

(60) Provisional application No. 63/270,157, filed on Oct. 21, 2021.

(51) Int. Cl.
| | | |
|---|---|---|
| *B42D 25/387* | (2014.01) | |
| *B41M 3/14* | (2006.01) | |
| *B42D 25/342* | (2014.01) | |
| *B42D 25/47* | (2014.01) | |
| *G06K 19/06* | (2006.01) | |
| *G06K 19/07* | (2006.01) | |

(52) U.S. Cl.
CPC ........... *B42D 25/387* (2014.10); *B41M 3/144* (2013.01); *B42D 25/342* (2014.10); *B42D 25/47* (2014.10); *G06K 19/06037* (2013.01); *G06K 19/0723* (2013.01)

(58) Field of Classification Search
CPC .... B42D 25/387; B42D 25/342; B42D 25/47; B41M 3/144; G06K 19/06037; G06K 19/0723; G09F 3/10; G09F 2003/0239; G09F 2003/0241; G09F 2003/0257; G09F 2003/0272
See application file for complete search history.

(56) References Cited

U.S. PATENT DOCUMENTS

| | | | | |
|---|---|---|---|---|
| 6,217,175 | B1 * | 4/2001 | Wong | B41M 3/148 |
| | | | | 359/534 |
| 8,585,222 | B1 * | 11/2013 | Bernath | G02B 5/128 |
| | | | | 359/529 |
| 10,554,401 | B1 * | 2/2020 | Lee | G06K 19/06037 |
| 11,241,902 | B1 * | 2/2022 | Smith | B42D 25/29 |

(Continued)

FOREIGN PATENT DOCUMENTS

| | | |
|---|---|---|
| BR | 102013008860 A2 * | 12/2014 |
| ES | 1208689 U * | 3/2018 |

(Continued)

*Primary Examiner* — Sonji N Johnson
(74) *Attorney, Agent, or Firm* — Brennan, Manna & Diamond, LLC (57) ABSTRACT

The present invention relates to a novel identification label that can be customized. The labels are designed to be either integrated or removably attached on exterior surface of consumer product containers allowing users to avoid potential confusion with respect to ownership, use or control of their containers. The label has an opaque scratch-off blank surface that can be removed to create a personalized identification mark. The label may have an UV-ink coating or can have a label layer for creating identification mark when the scratch-off blank surface is scratched. The labels are designed to be affixed on any personal item to prevent items from accidentally being misidentified.

11 Claims, 7 Drawing Sheets

(56) References Cited

U.S. PATENT DOCUMENTS

| | | | | |
|---|---|---|---|---|
| 2003/0024841 | A1* | 2/2003 | Murphy | B65D 5/00 |
| | | | | 53/474 |
| 2018/0137533 | A1* | 5/2018 | Pilarz | G06Q 30/0233 |
| 2019/0105145 | A1* | 4/2019 | Stampe | A01K 29/005 |
| 2019/0340612 | A1* | 11/2019 | Harris | G06Q 20/354 |
| 2020/0312197 | A1* | 10/2020 | Smith | B42D 5/04 |
| 2023/0121749 | A1* | 4/2023 | Lee | G06Q 20/065 |
| | | | | 713/171 |

FOREIGN PATENT DOCUMENTS

| | | | |
|---|---|---|---|
| ES | 1215050 U | * | 7/2018 |
| JP | 2015066808 A | * | 4/2015 |

\* cited by examiner

PERSONAL IDENTIFICATION MARKING LABEL DEVICE

CROSS-REFERENCE TO RELATED APPLICATION

The present application claims priority to, and the benefit of, U.S. Provisional Application No. 63/270,157, which was filed on Oct. 21, 2021, and is incorporated herein by reference in its entirety.

FIELD OF THE INVENTION

The present invention relates generally to the field of identification devices. More specifically, the present invention relates to a personal identification marking device for applying personalized markings and identifying individual items to avoid potential confusion with respect to ownership, use, or control. The invention features an appropriately sized scratch-off space that can be scratched using a fingernail, coin, key, or other item having a hard edge or point for creating customized markings to personalize an item on which the device is affixed. Accordingly, the present disclosure makes specific reference thereto. Nonetheless, it is to be appreciated that aspects of the present invention are also equally applicable to other like applications, devices and methods of manufacture.

BACKGROUND

By way of background, people like to drink beverages and consume nutritional products and other snacks and do not share with others. However, this becomes a problem at social events and parties and at homes having multiple people. Beverage containers, bottles, cans, cups, single service food packages, and other consumable items can be easily interchanged among people and people easily misidentify drinks at a party or other social events. Typically, at social events and parties, when multiple people gather, the same brand of refreshment is used for some or all the people. Generally, all the bottles or cans appear the same and people drinking the same brand of beverage often confuse which bottle, cup, can, container, or other vessel they were drinking from and therefore, the ownership becomes difficult. People end up consuming drinks or food products of others which can cause cross-contamination especially during the times of pandemic such as COVID 19 or flu. The cross-contamination due to the interchange of drinks and food products can be dangerous. Also, picking up and drinking another person's beverage or food product is considered impolite.

Sometimes, when people cannot identify beverages or containers as their own, they throw them away, ultimately wasting money and consumables, and adding to the environmental waste stream. People desire a mechanism that can be used as an identifier for distinguishing between beverage containers, bottles, cans, cups, single serve containers, and other consumable items.

Interchanging of beverage containers is a big problem in schools where children mistakenly pick up and use containers of each other. This may cause a health hazard and transmission of germs leading to illness and other undesirable health conditions. Parents desire improved beverage and other single serve containers that eliminate accidental interchanging of beverage and single serve containers.

Existing identification systems are not customized as per user preferences. Further, such systems have a predefined identification mark or symbol that can be common among users and other individuals, thereby not completely solving the problem. Such systems may not be cost-effective and/or easy to install, both for the manufacturers of beverages or other single serve containers and end consumers, and may not always be readily available, particularly at large events.

Therefore, there exists a long-felt need in the art for a beverage and other consumable single serve container identification system that can easily eliminate misidentification of drinks and other consumable food products at a party or other social events. There is also a long-felt need in the art for a personal identification device that uniquely identifies virtually any type of item such as, but not limited to water bottles, beverage bottles, cans, single serve containers, cups, and other consumable products. Further, there is a long-felt need in the art for an identification label that can be used by a consumer according to their preference. Moreover, there is a long-felt need in the art for a personalized marking and identification device that is cost-effective and easy to use, implement and install. Further, there is a long-felt need in the art for an identification system that eliminates accidental interchange of drinks and food products between people. Furthermore, there is a long-felt need in the art for an identification system that reduces risk of cross-contamination due to accidental interchange of beverages and food. Finally, there is a long-felt need in the art for an identification and marking device that can be used by both manufactures of beverages, consumer products and consumers alike for marking and identifying virtually any type of item.

The subject matter disclosed and claimed herein, in one embodiment thereof, comprises an identification device. The identification piece is used for making personalized or customized markings for identifying personal items to avoid potential confusion with respect to ownership or control. The identification and customization invention has a first side and a second side. The first side is UV-ink coated scratch-off blank surface, and the second side has an adhesive coating, which may be permanent, removable or repositionable adhesive. The UV-ink coated scratch-off blank surface is configured to be scratched using a hard edge surface such as a fingernail, coin, key, or other item for placing a personalized marking or other customization to identify an item on which the identification and marking label is disposed. The scratch-off blank surface maintains the personalized marking without any smear and smudge so that the indication applied by the user is not distorted leading to confusion by other individuals.

In this manner, the identification label device of the present invention accomplishes all of the forgoing objectives and provides users with an identification and marking system that offers a simple method of marking and identifying virtually any type of item such as, but not limited to, water bottles, beverage bottles, cans, single serve containers, cups, other consumable products, and more. The identification label device can be customized and individualized by a user by scratching a personalized marking, message or other indicia and therefore, eliminating any guesswork and potential confusion with respect to ownership or control. At parties, the present invention reduces cross-contamination due to interchange of beverages or food products as individuals can see the indication applied to the container.

Advantageously, the identification device can be integrated into beverage containers, single serve pouches or other vessels during manufacturing for providing customer safety. Also, the device can be removably attached by a consumer on their beverage or food container as per their preferences.

SUMMARY OF THE INVENTION

The following presents a simplified summary in order to provide a basic understanding of some aspects of the disclosed innovation. This summary is not an extensive overview, and it is not intended to identify key or critical elements or to delineate the scope thereof. Its sole purpose is to present some general concepts in a simplified form as a prelude to the more detailed description that is presented later.

The subject matter disclosed and claimed herein, in one embodiment thereof, comprises an identification label. The identification label is integrated or placed on an exterior surface of an item during manufacturing of the item for identifying the item with the identification label disposed thereon. The identification label further includes a first side and a second side, with the first side having a scratch-off blank surface, and the second side adhered to the exterior surface of the item. A label layer is disposed between the first side and the second side. The scratch-off blank surface is configured to be scratched to create a message, graphic or other indicia using an edge of a hard surface such as a fingernail, coin, key, or other desired item for placing a personalized marking to identify an item on which the identification label is disposed. The scratch-off blank surface selectively reveals the label layer upon being scratched. In an alternative embodiment, a pre-printed image may be applied beneath the scratch off layer such that upon removal of the scratch off layer the image becomes visible. In this way, the individual is not required to place his or her mark or ID on the product to avoid someone deliberately trying to contaminate their food or beverage, but the revealed image or portion thereof still provides some personalization and protection. In yet another embodiment, the label layer is a silver coated layer.

The subject matter disclosed and claimed herein, in one embodiment thereof, comprises an identification label. The identification label is removably attached on an exterior surface of a water bottle, beverage bottle, can, single service container, cup, or other consumable products, for identifying an item having the identification label disposed thereon. The identification label further includes a first side and a second side, with the first side having a scratch-off blank surface, and the second side having an adhesive coating, a silver coated layer disposed between the first side and the second side. The scratch-off blank surface is configured to be scratched using an edge of a hard surface such as a fingernail, coin, keys, or other desired item for placing a personalized marking to identify an item on which the identification label is disposed. The scratch-off blank surface reveals the silver coated layer upon being scratched displaying the design or mark created or revealing an underlying pre-printed image.

In yet another embodiment, the identification label device is attached to a back surface of a smartphone cover, and the personalized marking is smear resistant.

In yet another embodiment, the personalized marking is removed by wiping the scratch-off blank surface using a wet wipe or wet cloth.

In yet another embodiment, the personalized marking is permanent.

In yet another embodiment, the identification label device has one of a geometric or fanciful shape or in a preferred embodiment is a generally square or rectangular shape.

In yet another embodiment, the identification label device is integrated on an outer surface of an item such that the adhesive coating is not required.

In yet another embodiment, the identification label device is odorless, and non-toxic.

In yet another embodiment, the identification label device comes in a pack containing twenty identification labels as well as a tool for removing the coating to create an image or reveal an underlying design.

In yet another embodiment, a beverage or consumer food product container with a personal identification label device is disclosed. The container includes a container body having an exterior surface and an interior surface, a label is affixed to the exterior surface. The label has a scratch-off space, over at least a portion of the label designed to be scratched using a hard edge such as a fingernail, a coin, key, or other desired item for creating a marking to customize the beverage container. The label may be a two part label, with one part having the scratch off area and the second part having instructions for use of the label and any associated tool that may be provided with a kit for supplying the labels.

In yet another embodiment, an identification device is disclosed. The identification invention has a first side and a second side. The first side has a UV-ink coated scratch-off blank surface, and the second side has an adhesive coating, which may be one of a permanent, removable or repositionable adhesive. The UV-ink coating may be applied by one of flood coating, pattern coating, spot coating or combination thereof. In addition, the coating may be applied in one or more layers. The UV-ink coated scratch-off blank surface is configured to be scratched using a hard surface having an edge such as a fingernail, coin, keys, or other desired item for placing a personalized mark in order to identify an item on which the identification label is placed. The scratch-off blank surface maintains a personalized marking without any smear and smudge.

In yet another embodiment, a method of easily identifying a water bottle, a beverage bottle, can, cup, single serve container and any other consumable products using a personal identification label device is disclosed. The method includes the steps of initially providing the personal identification label device, with the personal identification label device including a UV-ink coated scratch-off blank surface. Next, scratching the scratch-off blank surface for creating a personalized marking or revealing a pre-printed message for identifying an item on which the personal identification label device is disposed.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a beverage container identification system that can easily eliminate misidentification of drinks at a party or other social event. There is also a long-felt need in the art for a personal identification device that uniquely identifies virtually any type of item such as, but not limited to water bottles, beverage bottles, cans and cups, single serve consumer product containers and other consumable products. Further, there is a long-felt need in the art for an identification label that can be used by a consumer as per their preference. Moreover, there is a long-felt need in the art for a personalized marking device that is cost-effective and easy to use, implement and install. Further, there is a long-felt need in the art for an identification system that eliminates accidental interchange of drinks and food products between people. Furthermore, there is a long-felt need in the art for an identification system that reduces the risk of cross-contamination due to accidental interchange of beverages or food products. Finally, there is a long-felt need in the art for an identification device that can be used by both manufactures of beverages, food products and consumers for marking and identifying virtually any type of item.

The present invention, in one exemplary embodiment, is a novel identification label. The identification label is used to make personalized markings or to reveal an underlying message to identify personal items to avoid potential confusion with respect to ownership, use or control of the item. The label is removably attached to an exterior surface of an item for identifying the item having the identification label disposed thereon. The identification label further has a first side and a second side, with first side having a scratch-off blank surface, and the second side having an adhesive coating. A silver coated layer is disposed between the first side and the second side, and the scratch-off blank surface is configured to be scratched using a hard surface or an edge surface such as a fingernail, coin, key, or other desired item for placing a personalized marking or revealing a pre-printed image to identify an item on which the identification label is disposed and the scratch-off blank surface reveals the silver coated layer on being scratched.

Figure 1A:
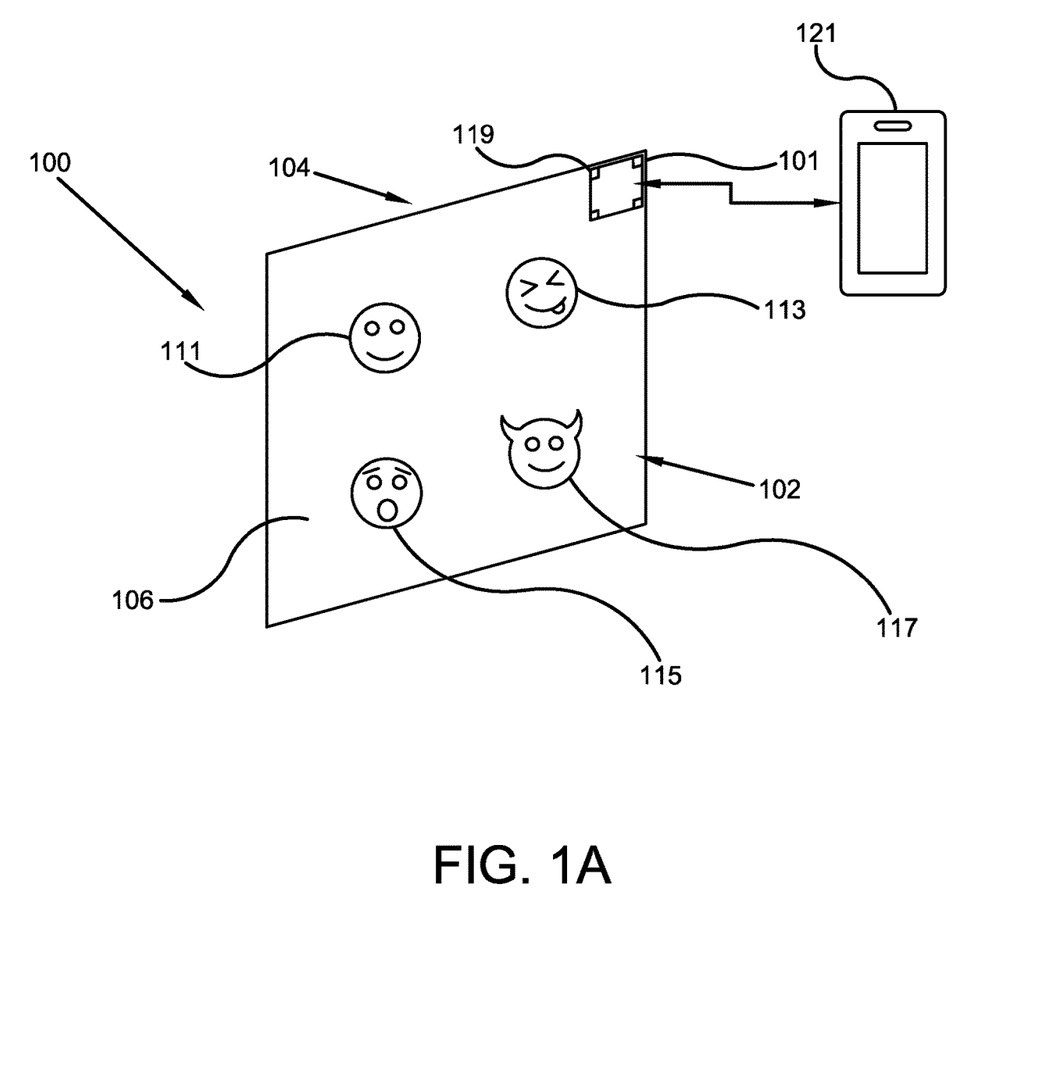
FIG. 1A illustrates a perspective view of one potential embodiment of the personal identification marking device of the present invention in accordance with the disclosed architecture.

Referring initially to the drawings, FIG. 1A illustrates a perspective view of one potential embodiment of the personal identification mark device 100 of the present invention in accordance with the disclosed specification. The personal identification mark device 100 is designed as a device that can be removably attached by a user or permanently integrated onto the outer surface of a utensil, cup, tumbler, single service container and or any item by a manufacturer. More specifically, the device 100 is a small and portable scratch-off surface that can be scratched using a hard surface having an edge such as a fingernail, coin, keys, or other desired item for making a customized identifying mark or revealing a pre-printed image for identifying the item on which the device 100 is disposed.

The device 100 of the present embodiment has a substrate 101 with a front surface/side 102 and a rear surface/side 104 with an adhesive layer 207. The front side 102 is visually exposed to users and has an opaque scratch-off blank surface 106. The scratch-off blank surface 106 is configured to be easily scratched by a hard surface having an edge such as a fingernail, coin, key, or other desired item for making a personalized marking by a user or revealing pre-printed image or images, 111, 113, 115 and 117. Different pre-printed images can be provided such that if someone else at the social event has selected the same image, the user may remove another image creating a different indicator than the previous person. In addition, indica can be provided that resembles the mood of the individual or their like or dislike of the item they are consuming.

Figure 1B:
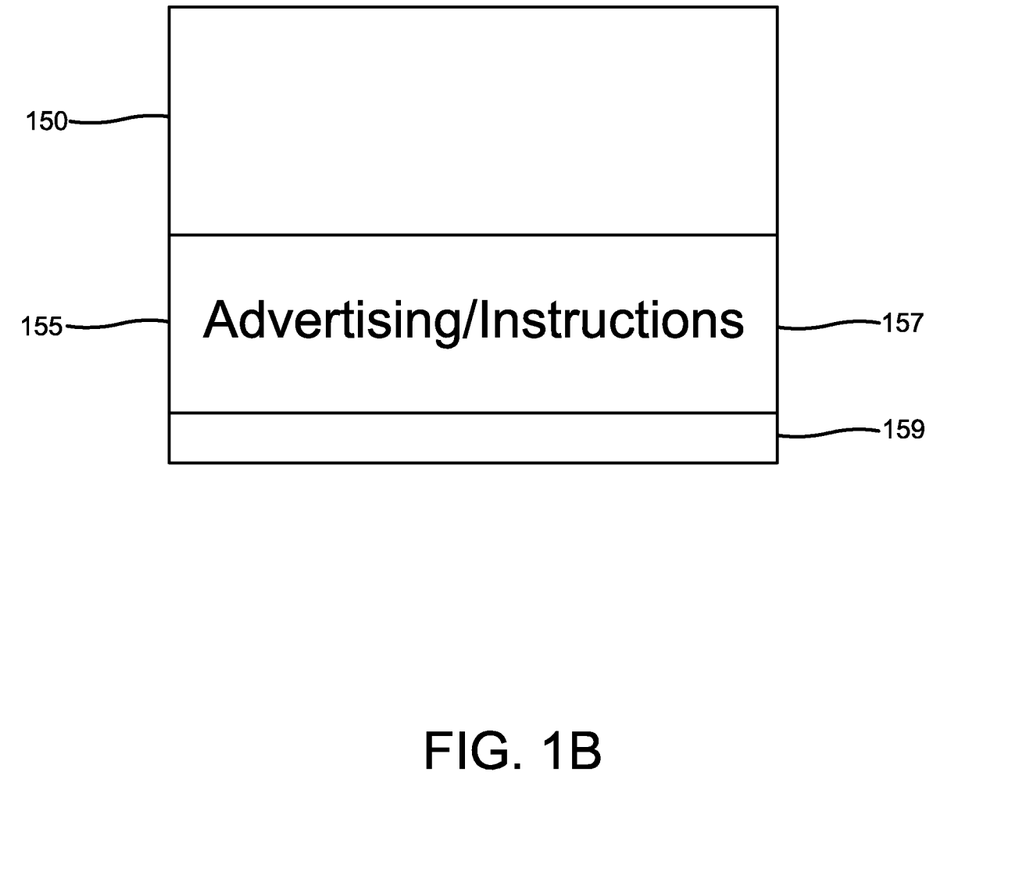
FIG. 1B illustrates a further perspective view of a potential embodiment of the present invention showing a pattern coating of scratch off material in accordance with the disclosed architecture.

The rear surface 104 is adhered to an item on which the device 100 is disposed. The label device 100 can be adhered on an item during manufacturing of the item. The scratch-off blank surface 106 has UV-ink coating allowing a user to scratch the surface 106 for making a personalized marking. The UV coating may be applied by one of a flood coating, pattern coating, spot coating or combinations thereof. The UV-ink coating is selectively removed from the scratch-off blank surface 106 along the positions where the surface 106 is scratched by a user for creating a personalized identification marking or revealing a pre-printed image that can be used as an identification mark for the item. In addition, the coating can be applied only in pre-determined areas allows the remainder of the label to be used for instructional or advertising purposes as seen in FIG. 1B in which section 150 is coated with the scratch off material and section 155 is uncoated and portion 157 is provided with indicia or other information. The label may also be provided with a reflective material or fluorescent material 159 to draw the attention of others to the label to make them aware of the personalization or customization. The reflective material may be one of a prismatic or beaded film material.

The scratch-off blank surface 106 is configured to be scratched using a hard edge surface such as a fingernail, coin, key, or other desired item for selectively removing UV-ink coating and creating the personalized identification marking. The label 100 may also have one of a scannable or readable tag 119 which can be scanned or read by a smartphone 121 to enable a user to record the date and time of the consumption of the beverage or food product. The readable tag may be a RFID tag, which may be a UHF or HF readable tag.

Figure 2:
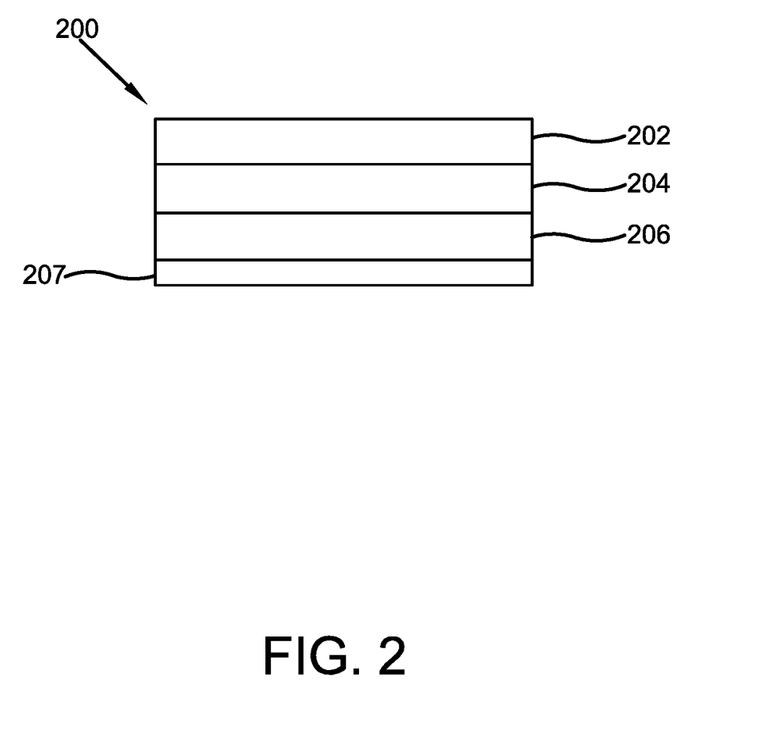
FIG. 2 illustrates a cross sectional view of another potential embodiment of the personal identification label of the present invention in accordance with the disclosed architecture.

FIG. 2 illustrates a cross sectional view of another potential embodiment of the personal identification label of the present invention in accordance with the disclosed specification. In the present embodiment, the label 200 has a multi-layer construction and an opaque scratch-off layer 202. The scratch-off layer 202 is removable to reveal an attached label layer 204. The label layer 204 becomes selectively visually exposed on scratching the layer 202, thus, providing a personalized marking on a container, package, pouch or the like on which the label device 200 is disposed. A third layer 206 is attached to the exterior surface of a container or any other item and can be integrated or removably attached to the exterior surface, such as through a permanent, removable or repositionable adhesive.

In the present embodiment, the scratch-off layer 202 is designed to be easily scratched or removed to reveal the label layer 204. Further, the scratch-off layer 202 has a dark color, preferably black and the label layer 204 has a lighter underlying tone, preferably a pastel color such as green, orange, cream, beige or others, thereby providing a contrast on the revealed label layer portion upon scratching the scratch-off layer 202. Preferably, the label layer 204 is a silver coated layer for providing smudge and smear resistant personal marking. Additionally, the label layer 204 may have phosphorescence properties allowing a user to easily identify the item even in low light or dark areas.

In cases where the label 200 is designed as an aftermarket product or as an accessory, then, the third layer 206 can be an adhesive layer for adhering the label device 200 on the exterior surface of a container or any other item. The adhesive may be selected from a permanent, removable, repositionable or combinations thereof.

Figure 3A:
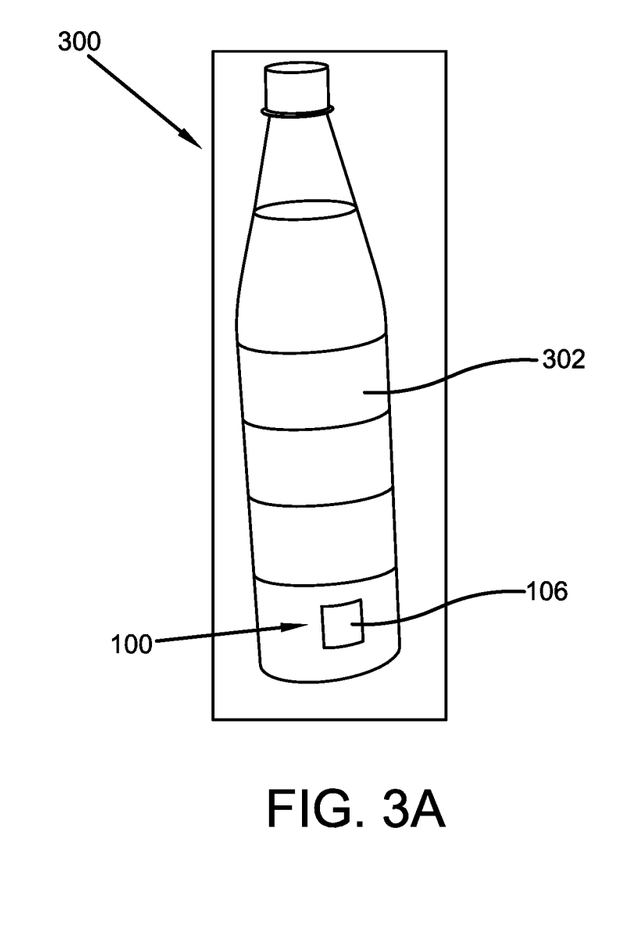
FIG. 3A illustrates a perspective view showing an exemplary beverage container having an integrated label device of the present invention in accordance with the disclosed architecture.

FIG. 3A illustrates a perspective view showing an exemplary beverage container having an integrated label of the present invention in accordance with the disclosed specification. The container 300, here embodied as a water bottle, has an exterior surface 302 having the label 100 (or 200) affixed at a suitable position depending on the design of the container 300 and preference of manufacturer of the container 300. The scratch-off layer 106 of the label device 100 is accessible to a user and can be scratched or abraded to selectively create a personal marking which may include selectively revealing one or more pre-printed images for identification of the beverage container 300.

Figure 3B:
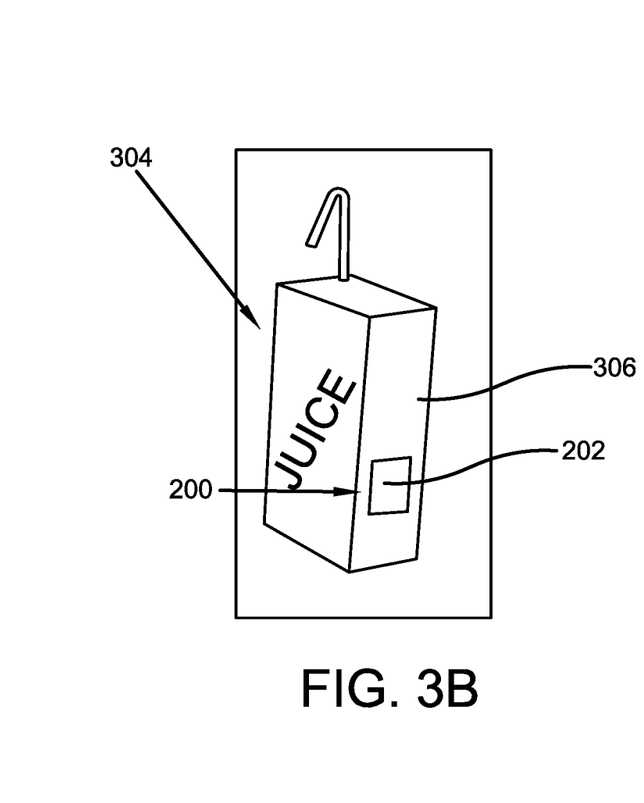
FIG. 3B illustrates a perspective view showing another exemplary beverage container having a removably attached label device of the present invention in accordance with the disclosed architecture.

FIG. 3B illustrates a perspective view showing another exemplary beverage container having a removably attached label of the present invention in accordance with the disclosed specification. The container 304 here embodied as a juice pack, has an exterior surface 306 having the label 200 (or 100) affixed at a suitable position depending on design of the container 304 and preference of manufacturer of the container 304. In the present embodiment, a consumer affixes the label 200 on the exterior surface 306 of the container 304 using the adhesive layer of the label device. The scratch-off layer 202 of the label device 200 is accessible to a user and can be scratched or abraded to selectively create a personal marking for identification of the beverage container 304.

It should be appreciated that although the beverage containers are shown as a plastic water bottle and a juice can, any known beverage or food container, glass, jar, carton made from glass, wood, metal, plastic or any other material known to be used for making beverage or food containers can be used with the label devices of various embodiments of the present invention.

Figure 4:
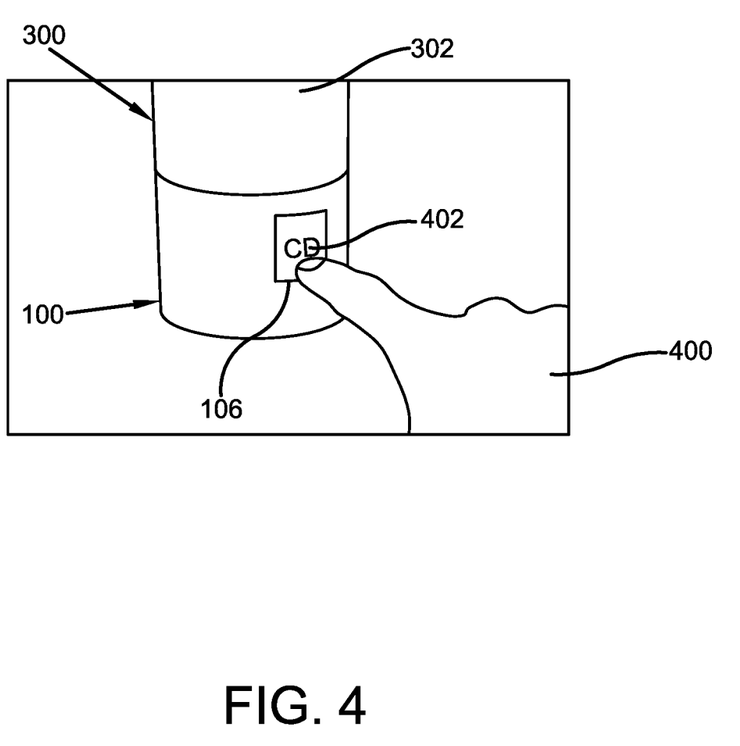
FIG. 4 illustrates a perspective view showing a user making a customized personal marking on the label of the present invention for identification of container of FIG. 3a in accordance with the disclosed architecture.

FIG. 4 illustrates a perspective view showing a user making a customized personal marking on the label of the present invention for identification of container FIG. 3a in accordance with the disclosed specification. As shown, the label device 100 (or 200) is affixed to the exterior surface 302 of the container 300. A user 400 selectively removes portions of the removable opaque scratch-off layer 106 to form a user-created personalized marking 402 or to reveal an underlying pre-printed image 111, 113, 115 and 117 in FIG. 1A. The scratch-off layer 106 can be removed by the user 400 with a hard edge such as a fingernail, a coin, keys, or other desired item. Further, as illustrated, the user 400 has customized the container 300 by scratching initials of the name, "CD."

Figure 5:
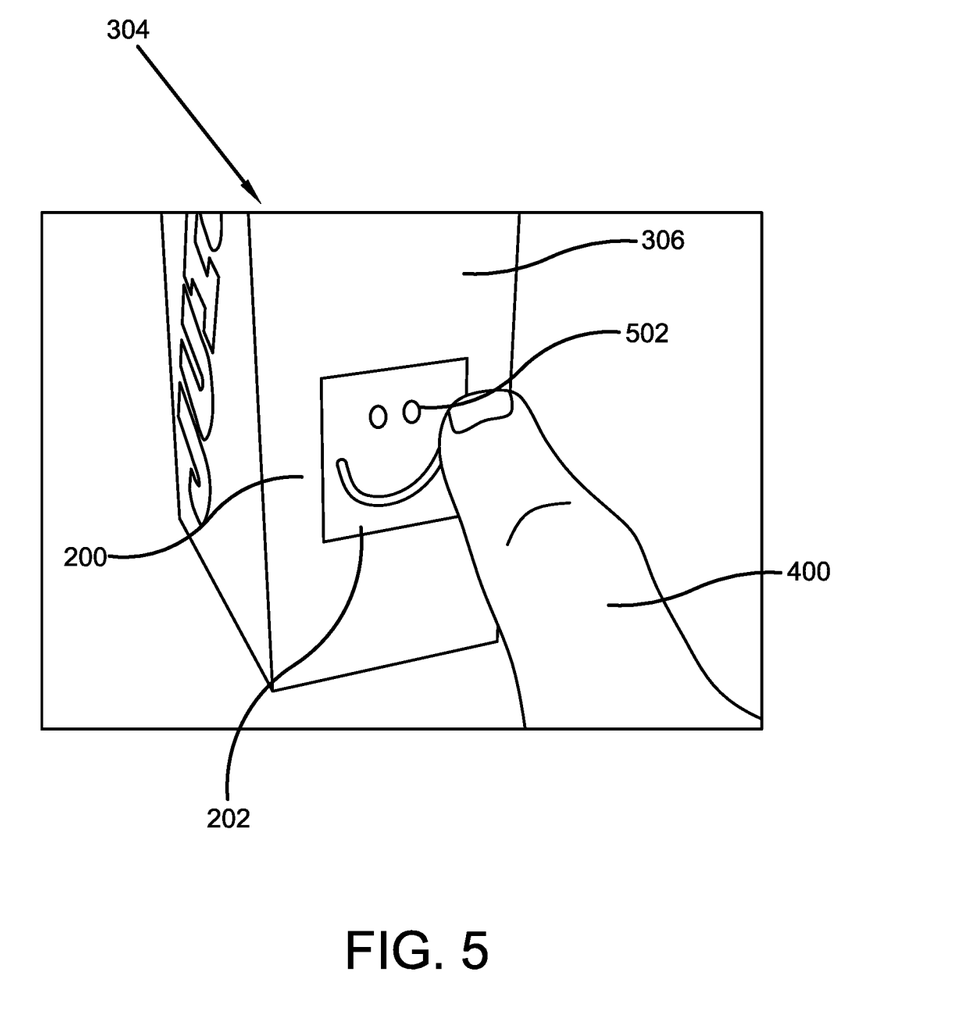
FIG. 5 illustrates a perspective view showing the user making a customized personal marking on the label device of the present invention for identification of a container of FIG. 3B in accordance with the disclosed architecture.

FIG. 5 illustrates a perspective view showing the user making a customized personal marking on the label of the present invention for identification of container of FIG. 3B in accordance with the disclosed specification. As shown, the label 200 is affixed to the exterior surface 306 of the container 304. The user 400 selectively removes portions of the removable opaque scratch-off layer 202 selectively revealing a label layer to form a user-created personalized marking 502. The scratch-off layer 202 can be removed by the user 400 with a hard edge or other corner surface such as fingernail, a coin, key, or other desired item. Further, as illustrated, the user 400 has customized the container 304 by forming a smiley indicium.

Figure 6:
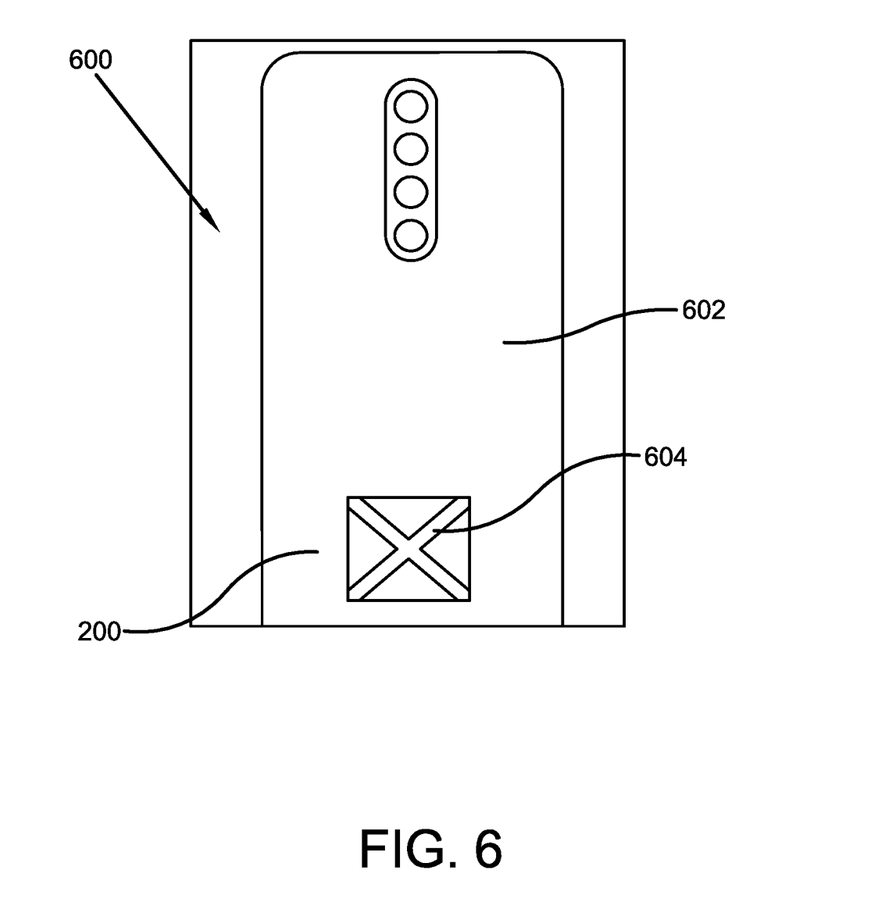
FIG. 6 illustrates a perspective view showing a customized personal marking on the label of the present invention for identification of a smartphone cover in accordance with the disclosed architecture.

FIG. 6 illustrates a perspective view showing a customized personal marking on the label of the present invention for identification of a smartphone cover in accordance with the disclosed specification. As shown, the label 200 is affixed to the rear surface 602 of the smartphone cover 600. Portions of the removable opaque scratch-off layer 202 are scratched to selectively reveal the label layer to form a user-created personalized marking 604. Further, as illustrated, the smartphone cover 602 is customized or personalized by forming a cross sign indicium. The device 100, 200 is also appropriate for, but not limited to, food storage bags and food take-out containers, and is both eco-friendly & environmentally friendly.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "label device", "identification label device", "identification device", "device", and "personal identification marking device" are interchangeable and refer to the personal identification label device 100, 200 of the present invention.

Notwithstanding the forgoing, the personal identification label device 100, 200 of the present invention can be of any suitable size and configuration as is known in the art without affecting the overall concept of the invention, provided that it accomplishes the above-stated objectives. One of ordinary skill in the art will appreciate that the personal identification label device 100, 200 as shown in the FIGS. are for illustrative purposes only, and that many other sizes and shapes of the personal identification label device 100, 200 are well within the scope of the present disclosure. Although the dimensions of the personal identification label device 100, 200 are important design parameters for user convenience, the personal identification label device 100, 200 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A customizable label comprising:
   a substrate having a front surface and a rear surface;
   a first portion containing a removable coating and a second portion containing an instructional or advertising information, wherein the removable coating is positioned over at least a portion of the front surface, wherein the removable coating is removable from the substrate by scratching or abrading to create the customized label;
   an adhesive positioned over at least a portion of the rear surface, wherein the adhesive is one of a removable adhesive, a repositionable adhesive, a permanent adhesive or a combination thereof; and
   a reflective material or a fluorescent material, wherein the reflective material is one of a beaded reflective material; and
   wherein the customized label comprises phosphorescence properties allowing a user to easily identify a consumer product even in low light or dark areas; and
   wherein the second portion is a silver coated layer adapted to provide smudge and smear resistant personal marking; and
   wherein the removable coating comprises an opaque flood coated UV-ink coating adapted to be selectively removed from portions of the removable coating to reveal a plurality of pre-printed images, each configured as different identification mark; and
   wherein the substrate is a lighter color than the opaque flood coated UV-ink coating to provide a contrast between a revealed portion of the substrate and a remainder of the opaque flood coated UV-ink coating for better visibility.

2. The customizable label as recited in claim 1 further comprising a scannable code or a readable tag.

3. The customizable label as recited in claim 2, wherein the readable tag is a RFID tag.

4. The customizable label as recited in claim 3, wherein the RFID tag is one of a HF tag or a UHF tag.

5. The customizable label as recited in claim 2, wherein the readable tag is readable or scannable by a smartphone.

6. The customizable label as recited in claim 1, wherein the scratching or abrading is performed by a tool.

7. A consumer product and label combination comprising:
   a consumer product container having an exterior surface;
   a label applied to the exterior surface via an adhesive, wherein the label comprises a substrate having a front surface and a rear surface;
   a removable coating applied over at least a portion of the front surface; and
   wherein the front surface of the label has a first portion coated with the removable coating and a second portion having an instructional information and an advertising; and
   wherein the second portion is provided with a reflective material and a fluorescent material; and
   wherein the reflective material is a prismatic material or a beaded reflective material; and
   wherein the label comprises phosphorescence properties allowing a user to easily identify the consumer product even in low light or dark areas; and
   wherein the second portion is a silver coated layer adapted to provide smudge and smear resistant personal marking; and
   wherein the removable coating comprises an opaque pattern coated UV-ink coating adapted to be selectively removed from portions of the removable coating to create a personalized identification marking or reveal a plurality of pre-printed images, each configured as different identification mark; and
   wherein the substrate is a lighter color than the opaque pattern coated UV-ink coating to provide a contrast between a revealed portion of the substrate and a remainder of the opaque pattern coated UV-ink coating for better visibility.

8. The consumer product and label combination as recited in claim 7,
   wherein the adhesive is applied on the rear surface of the label, opposite the removable coating.

9. The consumer product and label combination as recited in claim 8,
   wherein the adhesive is one of a removable adhesive, a permanent adhesive, a repositionable adhesive or a combination thereof.

10. The consumer product and label combination as recited in claim 7,
    wherein the removable coating is removed by one of a scratching or an abrading.

11. A personalized label for use with a consumer product, the personalized label comprising:
    a label comprised of a substrate having a lighter color, a first portion containing a removable coating and a second portion containing an instructional or advertising information, wherein the removable coating is applied over the substrate having a darker color;

an adhesive layer securing the label to the consumer product, wherein the adhesive is one of a removable adhesive, a repositionable adhesive or a permanent adhesive, and further wherein the removable coating is removed by one of scratching or abrading to create a personalized mark or reveal a pre-printed image; and a reflective material and a fluorescent material, wherein the reflective material is a beaded reflective material; and wherein the label comprises phosphorescence properties allowing a user to easily identify the consumer product even in low light or dark areas; and wherein the second portion is a silver coated layer adapted to provide smudge and smear resistant personal marking; and wherein the removable coating comprises an opaque spot coated UV-ink coating adapted to be selectively removed from portions of the removable coating to create a personalized identification marking er and reveal a plurality of pre-printed images, each configured as different identification mark; and wherein the substrate is a lighter color than the opaque spot coated UV-ink coating to provide a contrast between a revealed portion of the substrate and a remainder of the opaque spot coated UV-ink coating for better visibility.

* * * * *